July 7, 1942.  C. F. KLABURNER  2,289,273
BRAKE PRESSURE STABILIZER
Filed Feb. 10, 1941

Inventor
CHESTER F. KLABURNER.
By Howard J. Whelan.
Attorney

Patented July 7, 1942

2,289,273

UNITED STATES PATENT OFFICE 2,289,273

BRAKE PRESSURE STABILIZER

Chester F. Klaburner, Baltimore, Md.

Application February 10, 1941, Serial No. 378,225

1 Claim. (Cl. 138—31)

This invention refers to vehicles and more particularly to the brake structure for controlling the turning of their wheels. It has among its objects to provide a device for preventing of the locking of the brake mechanism; for improving the actions and reactions of the mechanism; and for absorbing shocks and preventing gripping of brakes at low speed tending to occur in its system. Another object is to have the device simple in construction and readily adaptable for insertion among the parts of a conventional fluid operated brake system without requiring radical or complicated arrangements for the purpose. A further object is to provide a convenient arrangement for the operation of the device and for adjusting the brake action through the use of the device. A still further object is to provide a stabilizing effect on the system that will enable the latter to be adjusted for thermometric conditions and unbalanced fluid contents in the system. Still another object is to have the device adaptable for adjustment by remote control or at a distant location remote from the device proper, and thereby make it more convenient to the operator and accessible to him while in his normal driving position for operating the pedals that actuate the system. An additional object is to have a visual method of observing what the condition of the braking sytem is at all times, and especially while the adjustment is being made by this device by the user, and such visual means placed where it will be more convenient to the operator.

Other objects will become apparent as the invention is more fully set forth.

A typical form of brake mechanism consists of a set of brake drums on the wheels of an automobile, which are actuated through the use of cylinders having pistons propelled by a fluid forced through tubing to them under pressure exerted on the fluid by pressure on the brake pedal. The tubing contains the fluid and keeps it completely within itself and the various cylinders used in the mechanism. The fluid travels inside the tubing as the cylinders move their pistons back and forth. There is no special arrangement for controlling the fluid in such a manner as to affect its quantitative action. In this invention the device used provides a cushioning reaction for the fluid when the stresses induced in its use become excessive. This device acts as a safety absorber of excess stresses by operating as an absorber during the period of stress, by allowing some of the fluid of the brake system to pass into a reservoir at that time, and then returning this fluid back into the system when the stress is over. The device may be placed in the system conveniently without affecting it materially as far as taking up space etc. is concerned, as it takes very little room, is of simple form, and has a convenient arrangement for attachment to the system. An important feature of the device is in the fact that it has arrangements for adjustment that make it available for taking-up the lack of or excess of fluid in the system due to thermometric expansion and contraction, during normal operating conditions, as well as at times of leakage of overfilling. The device thus acts as a stabilizer for the fluid system of the brake mechanism to keep it working effectively. With the adjustment placed under the control of the operator at his position of normal driving, enables him to do the adjusting of the system, cooperatively with his operation of the pedal controlling the movement of the braking fluid. This convenience permits one person to do the adjusting required. Otherwise if the adjustment was limited to the actual structure of device proper, it would be necessary for one person to do the adjusting at the structure, while another operated the pedal and called-out the reactions to the other, to inform the latter whether the adjustment was sufficient or not. This is due to the fact that one of the persons would probably be adjusting the device in a position under the vehicle inaccessible to the pedal, while the second person is in the vehicle at the driving seat, a position far from convenient contact with the body proper of the device. This function of the device enables one person to adjust it conveniently and in a way that is dependent on his own judgment entirely and his own operation directly. The device also includes a visual arrangement for indicating what is being done or required, during its operation by the user, in a most convenient location, and thereby make it possible to make the various adjustment without outside assistance.

In the drawing which indicates a form of this invention:

Similar reference characters refer to similar parts throughout the drawing.

Figures 1, 2:
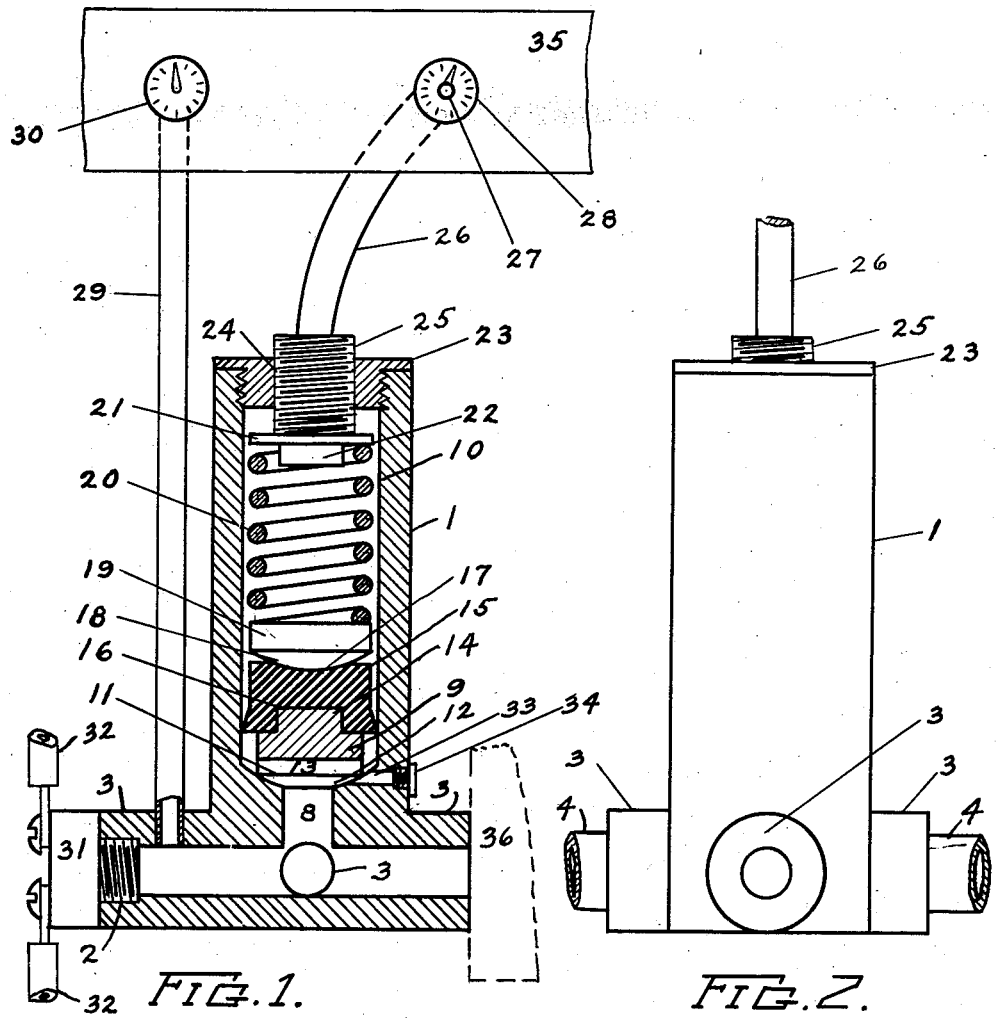
Figure 1 is a sectional elevation through a brake mechanism stabilizer embodying this invention.
Figure 2 is a view in elevation of Figure 1, taken at right angles thereto.
Figure 3:
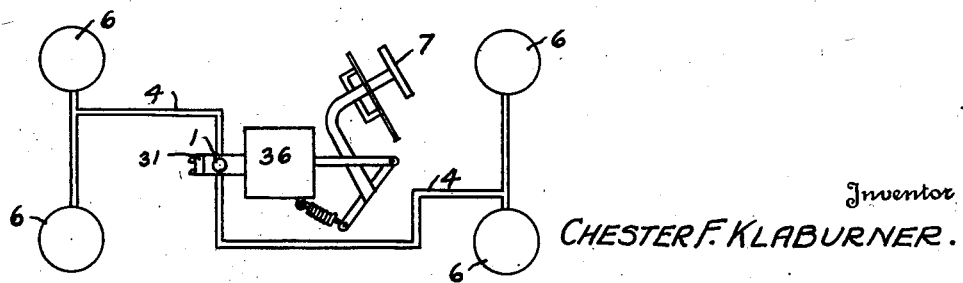
Figure 3 is a diagrammatic view of the brake system with stabilizer included.

In the structure indicated in the drawing, the stabilizer body 1, is preferably of the hollow T-like form shown, the lower channel portion 2 being screw-threaded at its projecting orifice portions 3 for the attachment of the piping 4 of the brake system in a somewhat conventional manner. The brake fluid 5 passes through this portion of the structure and flows to the various brake cylinders 6 at the operation of the pedal 7. The shank or cylinder of the T-form structure is provided with an opening 8 having access to the fluid, but is closed normally by a specially designed circular relief plug 9 with its periphery slightly away from the side walls 10. This plug member has its bottom surface 11 formed to allow a space 12 to exist between it and the upper line of the opening. It also has a slot 13 cut through its material adjacent to its surface 11, and also a projecting member 14 arranged for locking into a resilient bumper 15 attached to its upper surface 16. The bumper may be of rubber or other similar resilient material. The bumper is preferably circular with its lower portion closely fitting against the side walls 10 and wider than its upper portion as indicated in Figure 1. The upper portion is formed with a concaved recess 17 adapted to receive the rounded head 18 of push block 19. The latter is attached to a helical spring 20 which serves to keep it pressed stiffly against the bumper 15. The pressure on the bumper is transmitted to the plug member 9 and the latter in turn against the opening 8.

The upper portion of the spring 20 has a pressure plate 21 with a guide piece 22 mounted on it, to form means for compressing or resisting the tension of the spring. A cover 23 is attached to the shank cylinder to close it effectively and permit the placing of the parts 9, 15, 20 and 21 within it, or their inspection or repair afterwards. A screw-threaded hole 24 is provided in the cover 23, and has an adjusting stem 25 engaged in it. The adjustment of this stem in this hole, propels the pressure plate to control the tension of the spring 20, and in turn the pressure of the plug 9 over the opening 8. A flexible cable 26 is connected with the stem 25 and runs to a suitable location, such as the dash-board 35 of the vehicle, where the operator may control it through the operation of the manipulator handle 27 attached thereto and mounted on an indexed dial 28. A tubing 29 and dial 30 is so connected with the body 1, as to indicate the pressure of the fluid in the system, and thereby enable the operator to judge how much to adjust the manipulator during adjustment process or while the brake is working under normal or exceptional conditions. In other words the condition of his braking system is apparent to him visually at all times and provides him with definite information thereon, which under the present state is not apparent. The lighting switch 31 used for operating a rear signal of the vehicle is combined in the body at 3 a part thereof where it will not be subject to the usual wear and tear. While its wiring can be attached effectively as indicated at 32.

The operation of the device is as follows. The operator presses the brake pedal of the vehicle and thereby propels the braking fluid from the reservoir 36 through the brake systems to the brakes. If the pressure is too great the rebound of the fluid in the tubing builds up an excess pressure and this in turn is relieved at the device by raising of the relief plug 9 in the shank cylinder. The raising of the relief plug allows sufficient brake fluid 5 to flow into the shank cylinder and thus ease up on the brake system, which in turn prevents the locking of the brakes. The fluid cannot get past the bumper because of the latter's close fitting contact with the cylinder walls 10. The vent 33 and plug 34 are used during the installation of the device to allow the escape of accumulated air that may have been present.

The raising of the plug compresses the spring 20, and the bumper 15 as much as the excess pressure built up requires. As soon as the pressure eases off, the resiliency of the spring and bumper forces the plug 9 back against its opening 8. The slot 13 in the plug and space 12, under the plug assure of a constant supply of fluid in the device in contact with the plug 9 and serve to prevent sticking of the surfaces together, or closing of the opening by thickening of the fluid, partially or otherwise. The pressure on the system will be indicated by the pressure dial 30. During adjustment, the operator presses his foot on the pedal 7, watches the dial 30 and moves the manipulator handle 27 until the pressure indicated is satisfactory to him. This adjustment continues until he has arranged for all conditions determined by the operation of the pedal and the adjustment of the manipulator. It is performed while he is in the normal driving seat and without requiring any physical connection with the stabilizer parts that might dirty or inconvenience him. The indices on the dial 28 serve to provide the user with information as to how adjustment is to be made, and the amount of movement that various situations imposed by temperature, leakage etc. involve, in coordination with the pressure shown by the dial 30.

While but one form of the invention is indicated by the drawing and described herein, it is not desired to limit this application to that particular form or in any other way, otherwise than limited by the description and the claim, as it is appreciated that other forms and constructions could be embodied that would employ the same principles and come within the scope of the claim.

Having thus described the invention, what is claimed is:

A stabilizer of the class described comprising in combination, a body hollowed-out and having an access opening provided at one end portion thereof, said access opening leading to passages provided for fluid lines from various predetermined portions of a fluid braking system, a plug for resiliently closing the access opening, said plug being contoured to conform with the surface adjacent the opening and adjustable therewith to provide a tight joint at various positions therewith, said plug being less in size than the hollowed out portion to provide an annular space around it in the body, a resilient bumper for holding the plug resiliently and allowing it to adjust itself as aforesaid, said bumper being less in peripheral size than the hollowed-out portion through the greater portion of its length but having a limited extended edge provided for engaging the surface of the hollowed-out portion and keeping it resiliently in alignment therewith, a push block reciprocable in the hollowed out portion and spaced from the walls thereof and formed to engage and fit the bumper, a spring loosely mounted in the body for tensioning the block, member and plug, and means for keeping the spring aligned and adjusting its tension and closing the body against leakage of air or fluid.

CHESTER F. KLABURNER.